US009500293B2

(12) United States Patent
Valentin-Rumpel

(10) Patent No.: US 9,500,293 B2
(45) Date of Patent: Nov. 22, 2016

(54) PNEUMATIC DRIVE SYSTEM AND METHOD FOR OPERATING THE PNEUMATIC DRIVE SYSTEM

(71) Applicant: Frank Valentin-Rumpel, Gross-Umstadt (DE)

(72) Inventor: Frank Valentin-Rumpel, Gross-Umstadt (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 380 days.

(21) Appl. No.: 14/064,416

(22) Filed: Oct. 28, 2013

(65) Prior Publication Data

US 2014/0117263 A1    May 1, 2014

(30) Foreign Application Priority Data

Oct. 31, 2012 (DE) .................. 10 2012 021 388

(51) Int. Cl.
| | |
|---|---|
| *F16K 31/12* | (2006.01) |
| *F15B 5/00* | (2006.01) |
| *F16K 31/128* | (2006.01) |
| *F16K 31/124* | (2006.01) |

(52) U.S. Cl.
CPC .............. *F16K 31/12* (2013.01); *F15B 5/006* (2013.01); *F15B 2211/30565* (2013.01); *F15B 2211/6336* (2013.01); *F15B 2211/6653* (2013.01); *F15B 2211/6656* (2013.01); *F16K 31/128* (2013.01); *F16K 31/1245* (2013.01)

(58) Field of Classification Search
USPC ............ 251/25, 30.01; 91/6, 20; 137/38, 137/599.06, 599.07, 883
See application file for complete search history.

(56) References Cited

U.S. PATENT DOCUMENTS

| | | | | | |
|---|---|---|---|---|---|
| 3,038,449 | A | * | 6/1962 | Murphy, Jr. ........ | F15B 11/0426 137/596.16 |
| 3,813,990 | A | * | 6/1974 | Coppola ................. | F15B 18/00 244/194 |
| 4,420,113 | A | * | 12/1983 | Lacroix ................... | F23N 1/002 219/497 |
| 4,552,330 | A | * | 11/1985 | Grotloh ............... | F16K 31/1223 251/25 |
| 4,723,474 | A | * | 2/1988 | Flohr .................. | E21B 33/0355 251/29 |
| 4,815,694 | A | * | 3/1989 | Ferren ..................... | A62C 31/00 137/624.18 |
| 5,878,765 | A | * | 3/1999 | Lange ..................... | F15B 21/08 137/1 |
| 6,834,666 | B2 | * | 12/2004 | Murayama .............. | B25B 21/00 137/269 |
| 2009/0199703 | A1 | | 8/2009 | Hoffmann et al. | |
| 2009/0271128 | A1 | * | 10/2009 | Umekage .................. | G01F 1/00 702/45 |
| 2011/0284083 | A1 | * | 11/2011 | Tondolo ................ | F15B 20/002 137/1 |
| 2012/0153633 | A1 | | 6/2012 | Kolbenschlag | |
| 2013/0009080 | A1 | * | 1/2013 | Schrobenhauser ....... | F15B 9/12 251/30.01 |

FOREIGN PATENT DOCUMENTS

| | | |
|---|---|---|
| DE | 102008007651 | 9/2009 |
| DE | 102010054878 | 6/2012 |

* cited by examiner

*Primary Examiner* — Kevin Murphy
*Assistant Examiner* — Jonathan Waddy
(74) *Attorney, Agent, or Firm* — Schiff Hardin LLP

(57) ABSTRACT

In a method or device for operating a pneumatic drive system for actuating a control valve, a pneumatic working chamber is loaded with pneumatic pressure in order to move the control valve into a desired position. At least two pneumatic control signals are supplied to the working chamber by means of electropneumatic conversion.

14 Claims, 3 Drawing Sheets

PNEUMATIC DRIVE SYSTEM AND METHOD FOR OPERATING THE PNEUMATIC DRIVE SYSTEM

BACKGROUND

The disclosure relates to a pneumatic drive system and a method for operating a pneumatic drive system. The pneumatic drive system is used to actuate a control valve, particularly a regulating valve or a safety valve (emergency shut down (ESD valve)), of a processing plant, such as a petrochemical plant or the like. The pneumatic drive system of the generic type has a pneumatic working chamber and a current/pressure transducer, which is coupled to the working chamber, for loading the working chamber with a pneumatic pressure, by means of which pressure the control valve is moved. The current/pressure transducer has at least one electrical input for receiving an electrical actuating signal.

In many fields of application of the pneumatic drive system of the generic type, it is imperative that a desired position for the control valve is reached rapidly and reliably on the basis of a set-point/actual value regulation. Due to the force transmission by means of pneumatics, the drive system has a tendency to overshoot the set-point position and only to reach the desired position after a delay time.

For example, in the case of the use of the pneumatic drive system in an anti-surge control valve for protecting a compressor, it is imperative that the desired valve position is reached rapidly, wherein a precise position control should be ensured. In order to prevent the undesired operating state of the "pumping" of the compressor, the anti-surge valve should be opened rapidly, so that the output of the compressor can be reduced at the outlet. Overshooting of the anti-surge valve is to be prevented, in order to suppress dangerous operating states of the compressor.

In the case of position control for control valves which are not subjected to frequent operation, it may be the case that the valve member remains adhered on the sealing face of the valve seat. In this case, a larger force must be applied by the pneumatic drive system in order to release the valve member at the valve seat. The delay time incurred in the process makes a rapid and exact regulation problematic. If the control valve is used to regulate a process medium of the processing plant, the control valve has a tendency to vibrate due to excitation by means of the process medium. These vibrations make an exact regulation of the process medium difficult.

SUMMARY

It is an object to overcome the disadvantages of the prior art, particularly to provide a pneumatic drive system for actuating a control valve and a method for operating the pneumatic drive system, so that a rapid and exact position control can be achieved.

In a method or device for operating a pneumatic drive system for actuating a control valve, a pneumatic working chamber is loaded with pneumatic pressure in order to move the control valve into a desired position. At least two pneumatic control signals are supplied to the working chamber by means of electropneumatic conversion.

DESCRIPTION OF EXEMPLARY EMBODIMENTS

Figure 1:
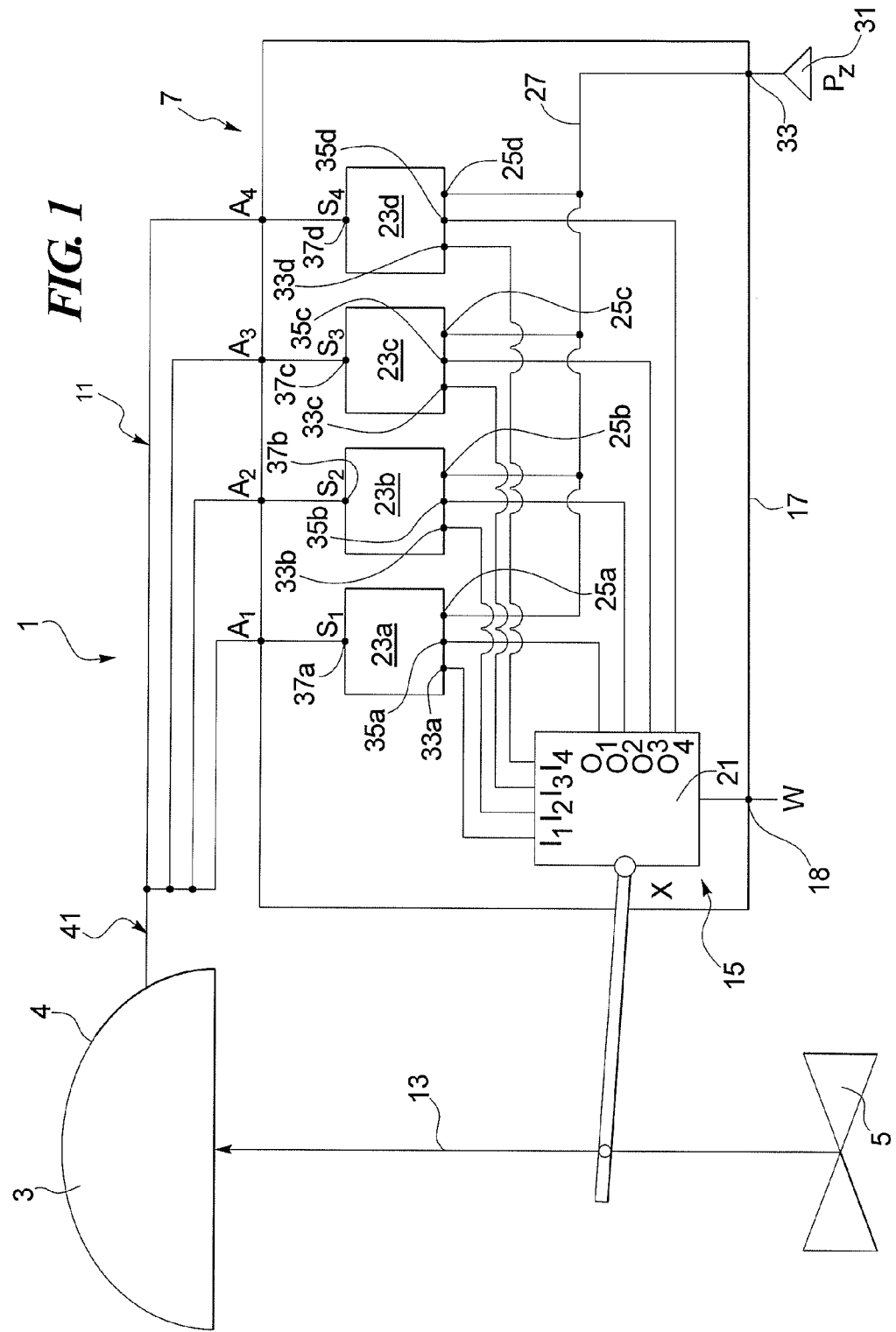
FIG. 1 shows a schematic illustration of a pneumatic drive system according to a preferred exemplary embodiment of the invention.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

A pneumatic drive system for operating a control valve, particularly a regulating control valve or a safety valve of a processing plant, is provided. The pneumatic drive system can for example be of the type of a single-action pneumatic drive, in which one pneumatic drive chamber and one reset chamber loaded with springs can be constructed within a drive housing. The two chambers can be separated from one another by means of a membrane. As a further drive type, a double-action pneumatic drive can also be provided, which principally has working chambers to be loaded with pneumatic pressure, which chambers are pneumatically separated from one another by means of a movable control piston. In the case of the double-action pneumatic drive, one of the chambers is considered in accordance with the exemplary embodiment in the following. With the measure according to the exemplary embodiment, also both can be acted upon. A current/pressure transducer is coupled with the pneumatic working chamber, which loads the working chamber with the pneumatic pressure, by means of which pressure the control valve is moved. The current/pressure transducer has at least one electrical input for receiving the electrical actuating signal. According to the exemplary embodiment, the current/pressure transducer is designed in such a manner that at least two pneumatic control signals or control pressure signals are generated, with which the working chamber is loaded. Depending on the operating state, the current/pressure transducer, particularly the electronics thereof, can have an activation and deactivation mechanism which activates and deactivates the respective pneumatic control signal or control pressure signal of the at least two pneumatic control signals or control pressure signals.

The pneumatic control pressure signals are independent of one another and can be supplied to the working chamber of the pneumatic drive system differently in accordance with the pressure value and also the supply time.

In a development of the exemplary embodiment, the current/pressure transducer generates the at least two control pressure signals independently of one another, particularly on the basis of two different control signals. The electrical control signal can be generated by a position controller or an electrical component of a position controller, which outputs the electrical control signal on the basis of a set-point/actual value comparison, on the basis of which comparison the respective pneumatic control signal is generated. The actual position value and the set-point position value are supplied to the position controller.

In a development of the exemplary embodiment, the current/pressure transducer supplies the at least two pneumatic control signals to the working chamber independently of one another. The at least two control signals can be supplied to the pneumatic working chamber abruptly or progressively to the maximum control pressure signal.

In a development of the exemplary embodiment, the current/pressure transducer supplies the at least two pneumatic control signals in accordance with a temporal clocking which is predetermined or in particular regulated by a position controller. In this case, the at least two pneumatic control pressure signals can be supplied to the working chamber simultaneously or one after the other in an added manner or one after the other in an alternating manner.

In a development of the exemplary embodiment, the particularly maximum pressure value of the at least two control pressure signals is pre-set. This can be achieved in particular in that an I/p pressure transducer component can be called upon for the control pressure conversion, which component can output just one fixed control pressure signal when a triggering electrical control signal is received.

Preferably, air flow rates of the at least two control signals are pre-set. This may mean that the current/pressure transducer allows the triggering and non-triggering of the control signals which, when triggered, allows a predetermined air flow rate towards the working chamber. The air flow rate can be regarded as a volumetric flow or mass flow. Of the at least two control signals of the current/pressure transducer, particularly one can have a low air flow rate and another one can have a large air flow rate, the large flow rate in particular being twice as large as the low air flow rate. Preferably, the current/pressure transducer can be controlled and/or regulated in such a manner that for a rapid displacement of the control valve, first the control signal with large air flow rate or both control signals with large and low air flow rates simultaneously are supplied. In a second control and/or regulation step just the control signal with low air flow rate is supplied to the working chamber in accordance with operation only.

In an exemplary embodiment, one of the at least two control pressure signals is a low pressure control signal and the other is a high pressure control signal. The high pressure control signal is used to overcome a large control amplitude as rapidly as possible, whilst the low pressure control signal can be used to realize a fine adjustment of a position control pre-set. Preferably, the high pressure control signal is at least twice as large as the low pressure control signal. The current/pressure transducer can be regulated in such a manner that for a rapid displacement of the control valve, at first at least the high pressure control signal and subsequently, particularly exclusively, the low pressure control signal is supplied to the working chamber.

In a development of the exemplary embodiment, the current/pressure transducer comprises regulating electronics, such as a microcomputer. The regulation electronics regulate the generation and/or supply of the at least two control pressure signals on the basis of one received setpoint control value, which can for example be supplied by a control desk to the pneumatic drive system, and if appropriate an actual control value, which is received from a position sensor, which can in particular be part of the pneumatic drive system. In this case, the regulation electronics can be coupled with at least two I/p transducers of the current/pressure transducer in accordance with the regulation. The at least two I/p transducers can operate independently of one another and generate the respective pneumatic control signal of the at least two control signals in particular after receiving an electrical control signal of the regulating electronics specified before the respective I/p transducer. In this case, the at least two I/p transducers can be attached to a single compressed air source, preferably of constant supply pressure of 6 bar in particular.

Preferably, the regulating electronics have a clock generator or an activation and deactivation mechanism, which accesses the respective I/p transducer in accordance with the control. The clock generator can clock the loading of the working chamber with the at least two pneumatic control signals in such a temporal manner that the control pressure signals are supplied to the working chamber simultaneously or successively overlapping one another or mutually exclusive in a time period in accordance with the regulation. The control pressure signals can be pre-set in accordance with their pressure value, whereby the time sequence can constitute a regulation parameter of the regulating electronics.

In a development of the exemplary embodiment, the current/pressure transducer comprises a group consisting of two at least modular electronic components of different functionality and at least one modular slot for occupation with one electronic component in each case. Preferably, at least one electronic component is an I/p transducer. In this case, the at least two electronic components of the group and the at least one slot are modularly adapted to one another in such a manner that the electrical and if appropriate pneumatic interface thereof merge into one another in a functionally and operationally reliable manner in each case when occupying the slot. At the occupied position in the slot, the interfaces of the inserted electronic components and also the interface of the slot are located diametrically opposite to one another, so that electrical contact and if appropriate a pneumatic, pressure-lossless coupling are produced. In this case, the current/pressure transducer can also have electronic components which are not arranged in a modular slot. A modular slot is used for accommodating a singular modular electronic component.

In an exemplary embodiment, the at least one modular slot has one modular docking mechanism in each case for the at least one modular electronic component. The docking mechanism is designed to securely accommodate and hold the respective electronic component in the modular slot, particularly by means of latching, and also if appropriate to release, particularly in a destruction-free manner and preferably manually, particularly without a special tool, for an exchange of the electronic components.

Preferably, the current/pressure transducer has at least two modular slots which are occupied with at least two I/p transducers. Furthermore, a clock generator can be provided on a modular slot, which activates and deactivates a respective I/p transducer in accordance with operating mode and operating state. In the interim period, the inactive I/p transducer remains in the slot in a passive waiting position. Preferably, the at least one slot has an electrical interface and if appropriate a pneumatic interface connected to the pneumatic supply inlet of the pneumatic drive system for pneumatically coupling a pneumatic connection of the I/p transducer.

In a development of the exemplary embodiment, the current/pressure transducer has at least two pneumatically separated pneumatic outlets which are connected to the one working chamber. One respective pneumatic control signal of the at least two control signals can leave the current/pressure transducer separately from one another at the pneumatic outlets. The at least two pneumatic outlets can in each case be formed by an individual output of one I/p transducer.

In an exemplary embodiment, a line network with at least two parallel lines is connected starting from the current/pressure transducer. The at least two parallel lines in each case carry one respective control signal towards the pneumatic working chamber. At the at least two pneumatically separate pneumatic outlets, one separate parallel line in each case can be connected, which each open separately in particular into the working chamber particularly at a separate opening in each case, which is constructed in a drive housing adjoining the working chamber. Alternatively, the parallel lines can open in a main supply line which leads into the working chamber. The at least two control signals reach the joining switch point of the main supply line and can combine with simultaneous loading. In the respective lines, the control signals can make it into the working chamber completely uninfluenced by the current/pressure transducer. Of course, the respective control signals emanating from the current/pressure transducer can be operationally modified along the respective line, for example in that pneumatic components, such as a quick exhaust valve, a pneumatic switch, or an air booster are used in the line. In particular, it may be advantageous to modify a pressure signal of certain pneumatic pressure generated by the current/pressure transducer such that the control pressure remains constant, while the air flow rate, that is to say the volumetric flow, is increased.

Furthermore, the exemplary embodiment relates to a method for operating a pneumatic drive system for actuating a control valve, particularly the regulating valve or a safety valve of a processing plant. The method according to the exemplary embodiment can be designed in accordance with the functioning of the pneumatic drive system according to the exemplary embodiment.

In the method, a pneumatic working chamber is loaded with pneumatic pressure, in order to move the control valve into a set-point position. According to the exemplary embodiment, two or a plurality of pneumatic control signals are supplied to the one working chamber of the pneumatic drive system by means of or on the basis of electropneumatic conversion. In the case of a double-action pneumatic drive, two pneumatic control signals in each case can be supplied to the one and the other pneumatic working chamber. In this case, four control pressure signals are to be generated.

In a development of the exemplary embodiment, each control signal or control pressure signal is generated by an individual current/pressure conversion procedure. Preferably, the control signals or control pressure signals are supplied in an overlapping manner or mutually exclusive or successively in the one working chamber.

In an exemplary embodiment, the at least two control signals are provided with differently sized pressure amounts, wherein initially only one high pressure control signal is output to the one working chamber particularly in the event of the exceeding of a set-point value change limit of a position control procedure and/or in the event of the triggering of a set-point value change. The low pressure control signal can follow the high pressure control signal in an overlapping manner particularly for the fine adjustment of the pneumatic pressure in particular to be regulated in the working chamber. Preferably, in the event of going below the set-point value change limit, only a low pressure control signal is output to a working chamber, in order to prevent an overshooting of the control valve.

In an exemplary embodiment, the air flow rates of the at least two control pressure signals are pre-set. The pre-set air flow rates are output in the event of the triggering of the respective control signal without providing the possibility of changing it again during output.

In an exemplary embodiment, of the two control signals, one is provided with a low air flow rate and another one is provided with a high air flow rate, the high air flow rate in particular being at least twice as large as the low air flow rate. For example, for a rapid displacement of the control valve, initially the control signal with high air flow rate or both control signals with high and low air flow rate and subsequently only the control signal with low air flow rate are supplied to the working chamber.

In an exemplary embodiment, for regulating the position of the control valve, the at least two control signals are provided with differently sized air flow rates. The at least two pneumatic control signals can be supplied to the working chamber simultaneously. In the event that a permitted vibration amplitude limit and/or vibration frequency limit is exceeded at the control valve, the control valve with high air flow rate is switched off whilst maintaining the switching position of the control valve with low flow rate, and if appropriate after exceeding the permitted limits, the control signal with high air flow rate is reactivated.

In an exemplary embodiment, to displace the control valve of an anti-surge control valve in particular, two control signals, particularly with differently sized pressure values, are simultaneously supplied to the one working chamber during a preferably predetermined pulse period of particularly less than one second or for as long as it takes for the control valve to respond. Subsequently, one of the control signals, particularly the high pressure control signal, is switched off because then only a low pressure control signal shall act. The length of the pulse period can for example be set from empirical references with respect to identical or similar control valves.

Preferably, for regulating the position of the control valve, the at least two control signals are provided with differently sized pressure values, the at least two pneumatic control signals being supplied to the one working chamber simultaneously. In the event that a permitted vibration amplitude limit and/or vibrating frequency limit is exceeded at the control valve, the high pressure control signal is switched off while maintaining the low pressure control signal and, if appropriate, the high pressure control signal is reactivated after falling below the permitted limit.

In an exemplary embodiment, the at least two control pressure signals are provided with differently sized pressure amounts or air flow rates, wherein in particular only the high pressure control signal or the control signal with high air flow rate is switched on for opening or closing a safety valve and/or only the low pressure control signal or control signal with low air flow rate is switched on for carrying out a partial stroke test.

In an exemplary embodiment, for a rapid regulation of the pressure in a volume, such as the working chamber or a supply line, in the event of a large set-point value change, at least two pneumatic signals are supplied to the volume simultaneously, at least over a short period of time following the set-point value change. The signals can in each case comprise one or a plurality of high pressure and low pressure control signals, which induce different volumetric flows in particular. In the event of a small set-point value change, the volume can be loaded with just one control pressure signal, particularly low pressure control signal. If the volume is loaded with at least two pneumatic control signals, the high pressure control signal can be switched off temporally before the low pressure control signal, particularly as soon as a preferably predetermined pressure threshold value close to the set-point value is reached in the volume. A fine adjustment of the pressure in the volume can take place by means of the regulation of the low pressure signal.

In an exemplary embodiment, a rapid regulation of a valve position of a valve, such as an anti-surge control valve for protecting a compressor, can be achieved in that the output valve is controlled with two pneumatic signals simultaneously for opening an outlet valve of the compressor. In this case, a high pressure control signal can be fed to the pneumatic drive at least until the response of the valve opening movement, so that the output of the compressor is cleared as rapidly as possible and the compressor is not overloaded. The high pressure control signal can be switched off after the response, in order to prevent an overshooting beyond the desired valve position. The low pressure control signal can be called upon exclusively for fine regulation of the valve position. Preferably, when closing the valve, only the low pressure control signal is supplied to the pneumatic drive, in order to safely prevent a dangerous state of the compressor.

In an exemplary embodiment, for precise control of a valve position of a valve using a pneumatic drive, two different control pressure signals are supplied to the pneumatic drive. A high pressure control pressure signal is in this case applied to the pneumatic drive only for a short time simultaneously with a second control pressure signal. By means of the short pulse with large volumetric flow, the static friction of the valve is rapidly overcome. Preferably, the pulse length in a reference opening process is determined as the time period between the loading of the pneumatic drive and the breaking away of the valve. The high pressure control signal can safely be switched off in good time, particularly in a time-controlled manner, without feedback of the valve position having to take place, so that overshooting is prevented and a rapid control is ensured. Alternatively, the high pressure control signal can also be called upon beyond the pulse duration for regulating the valve position, but it is switched off before the second control pressure signal.

In an exemplary embodiment, the valve position of a valve with pneumatic drive is regulated by two control pressure signals, particularly a high pressure and a low pressure control signal. If a tendency to vibrate, for example due to pressure surge excitations from the process medium, is detected, a control pressure signal, preferably the high pressure control signal can be switched off or just one signal for controlling the valve can be supplied to the pneumatic drive. As soon as it is detected that the vibrations no longer occur, both control pressure signals can be used again for valve position regulation.

In an exemplary embodiment, a high pressure control signal or two control pressure signals are used for the rapid opening or closing of a safety valve. Preferably, the movability of the safety valve is ensured in a non-safety-critical operating situation in that a control pressure signal, particularly a low pressure control signal is applied to the pneumatic drive for actuating the safety valve and in the process, a partial stroke test, particularly between 100% of the open position and 80% of the open position of the safety valve is traveled.

In FIG. 1, a pneumatically operated drive system according to an exemplary embodiment is generally provided with the reference number 1. A control valve 5 is actuated by means of the drive system, which is used for regulating a process fluid flow of a processing plant, which is not illustrated, such as a petrochemical plant, a food processing plant, such as a brewery, or the like. The control valve can also be an anti-surge control valve of a compressor or a safety emergency shutdown valve. The pneumatic drive system 1 comprises a pneumatic actuator 4 with a working chamber 3, which acts on the control valve 5 for regulating the process fluid flow of the processing plant, which is not illustrated, and a current/pressure transducer 7, which is constructed as a position controller and to which a pneumatic line system 11 connects for connecting to the working chamber 3 of the control drive 4.

The control valve 5 is connected to the pneumatic actuator 4 via a spindle or shaft 13. A position sensor 15, which is arranged partially within a housing 17 of the current/pressure transducer 7, picks up the instantaneous position X of the control valve 5. The position sensor 15 emits a position signal to a microprocessor 21, which according to the illustration is accommodated in an internal space of the housing 17 and receives a set-point control signal w from a control center of the processing plant, which is not illustrated in any more detail, via a field input 18. In addition to the electrical field input 18, the current/pressure transducer has a field input 33, which is connected to a pneumatic supply source 31, and also four outputs $A_{1-4}$, which provide the pneumatic or electrical output signals $S_{1-4}$ of the plug-in slots or slide-in slots 23a, 23b, 23c, 23d externally to the current/pressure transducer 7.

The current/pressure transducer 7 or the position controller has four essentially identically structured plug-in slots or slide-in slots 23a, 23b, 23c, 23d, which are freely accessible from outside and which can optionally be occupied with four individual electronic components of very wide ranging design. The electronic component may be an I/p transducer, a data memory, a pneumatically operated electric generator, the microprocessor 21 and/or an electronic switch, wherein electronic components of identical design and different functionality or performance parameters can be inserted into the slots. The slots 23a to 23d are modularly adapted in such a manner that depending on which predetermined electronic component is inserted, they ensure the function of the electronic component by producing communication lines to the respective other components.

The slots 23a to 23d have a pneumatic input interface 25a to 25d, which is connected to a supply line 27, and also electrical input interfaces 35a to 35d, which are connected to the microprocessor 21, and output interfaces 33a to 33d. Each slot 23a to 23d additionally has an output interface 37a to 37d, by means of which output signals either of an electrical nature (not illustrated in FIG. 1) or of a pneumatic nature $S_{1-4}$ can be output at the respective output $A_1$ to $A_4$. In the design illustrated in FIG. 1, four I/p transducers are provided in the slots 23a to 23d, which output pneumatic control pressure signals $S_{1-4}$ via the outputs $A_{1-4}$.

The pneumatic outputs $A_{1-4}$ open in a common line 41 for controlling the working chamber 3. Although not illustrated, one or two outputs can also be connected directly to one or a plurality of working chambers of an actuator via separate lines.

Depending on which air power should be assigned to the electropneumatic field device 7, the slots 23a to 23d can also be occupied with four very different I/P transducers. If a slot 23a to 23d is occupied with an I/P transducer, then the microprocessor 21 detects the occupation via, for example, a suitable sensor system, which is not illustrated, and/or via the respective line connecting the electrical input interface 35a to 35d to the electrical microprocessor output $O_{1-4}$.

Actuator wiring can be achieved by means of four separate I/p transducers inserted into the slots 23a to 23d with four decoupled control pressure signals, which realize a quadruply supplied air line with common control and identical air power of the I/p transducer in each case. Thus, the control valve can even bring about the desired position relatively rapidly in the case of large loads, wherein if necessary, one, two or three control pressure signals can be switched off for fine regulation, in order to prevent possible overshooting when running up to the desired control position.

If a plurality of slots 23a to 23d should be occupied with different I/P transducers, then the microprocessor 21 can select one of the same for operating the actuator 3 or control a plurality thereof simultaneously. If, for example, the microprocessor 21 selects the I/P transducer arranged in the slot 23c with a certain air power, then the microprocessor 21 outputs a corresponding electrical regulating signal via its output $I_3$ to the I/P transducer arranged in the slot 23c, which outputs a corresponding air pressure signal $S_3$ via the pneumatic output interface 37c to the pneumatic actuator 3, wherein the remaining I/P transducers in the slots 23a, 23b, 23d remain deactivated or at least unaddressed by the microprocessor 21.

Instead of a plurality of I/P transducers, other components of the current/pressure transducer can also be inserted in the slot 23a to 23d, such as the microprocessor 21, a data memory, a radio module or an electrical circuit for communicating with external electrical components.

Figure 2:
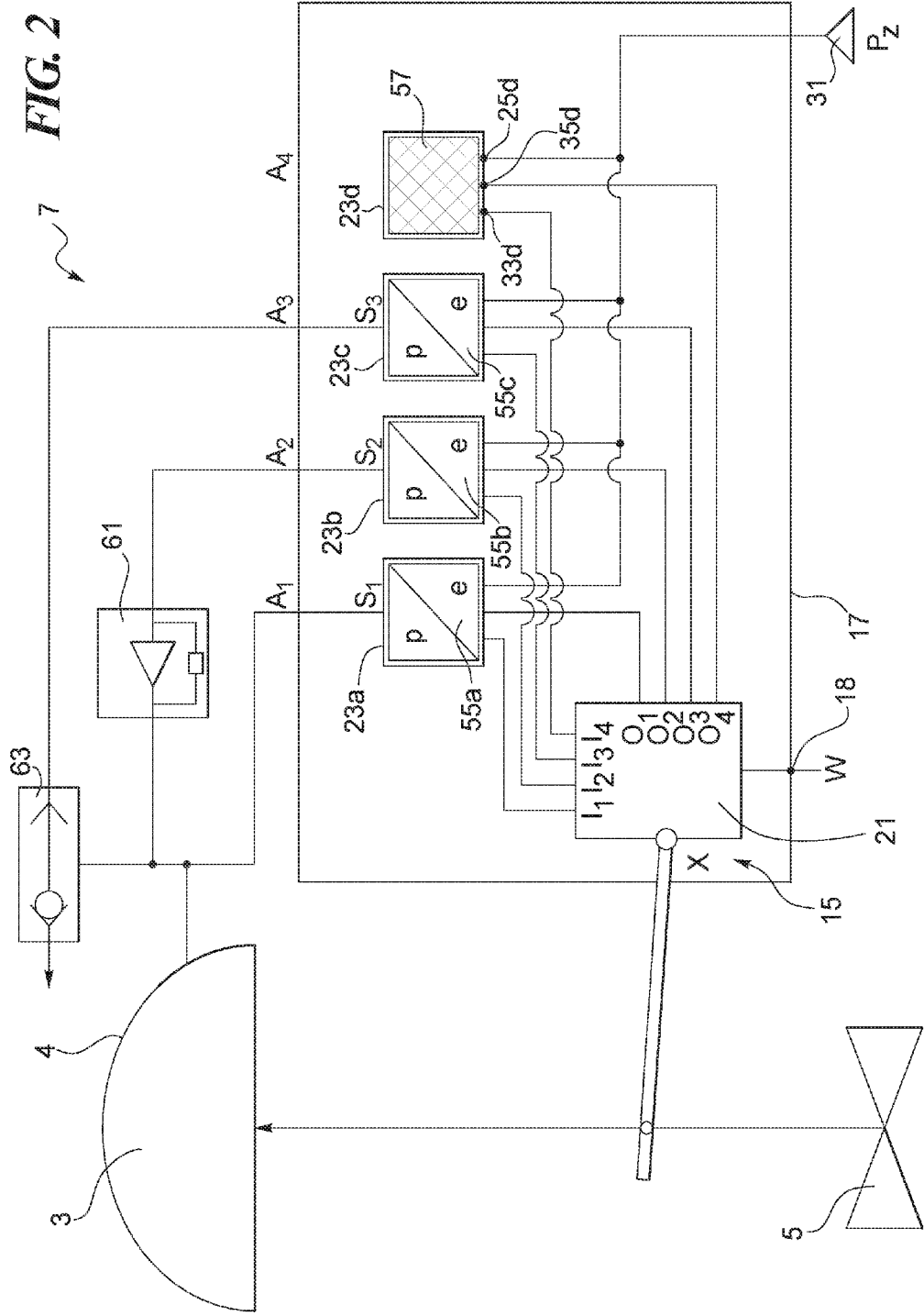
FIG. 2 shows a schematic illustration of a further preferred exemplary embodiment of the pneumatic drive system.

In FIG. 2, three of the modular slots 23a to 23d of the current/pressure transducer 7 are occupied with an I/P transducer 55a, 55b, 55c and one of the modular slots 23d is occupied with a functionless empty module 57.

The I/p transducers 55a, 55b, 55c generate three pneumatic control pressure signals $S_{1-3}$. The control pressure signal $S_1$ is fed directly to the supply line of the actuator 3. The control pressure signal $S_2$ is boosted via a volume booster 61 and is coupled as a signal with larger volumetric flow with the supply line of the actuator 3. The third control pressure signal $S_3$ is used essentially for connecting a quick exhaust valve 63 to the actuator 3, which in the case of a predetermined control pressure signal drop at the output $A_3$ leads to the ventilation of the pneumatic lines for the actuator 3.

Figure 3:
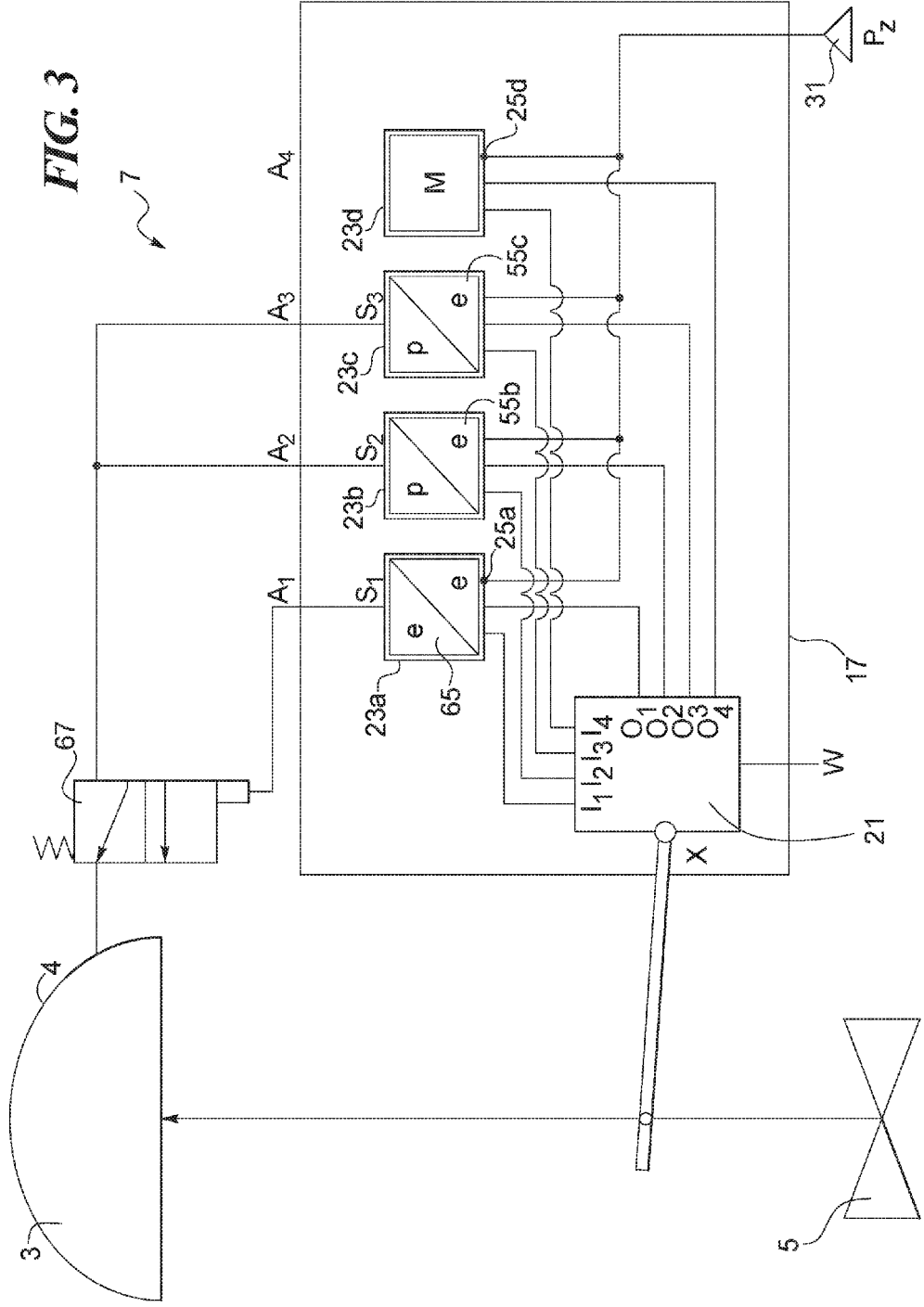
FIG. 3 shows a schematic illustration of a further exemplary embodiment of a pneumatic drive system.

In FIG. 3, the current/pressure transducer 7 is constructed in such a manner that an electrical output stage 65 for controlling a solenoid valve 67 is arranged in the slot 23a. Furthermore, two I/p transducers 55b, 55c are inserted in the slots 23b and 23c. The outputs $A_{2-3}$ of the I/p transducers 55b, 55c are coupled in a common supply line for the actuator 3. For example, a data memory M is provided in the fourth slot 23d. The solenoid valve 67 can be controlled in such a manner that the control pressure signals $S_{2-3}$ of the I/p transducers can be conducted to the actuator or for venting or exhausting the actuator. The control pressure signal conducted to the actuator in the case of an interconnected solenoid valve 67 can comprise just one of the control pressure signals $S_2$ and $S_3$ or a combination of both control pressure signals $S_2$ and $S_3$, depending on the control of the I/p transducers. Generally, one of the control pressure signals is realized as a high pressure signal and one of the control pressure signals is realized as a low pressure control signal, in order to achieve a greater variability in the control of the actuator.

Depending on the performance parameters and the number of used I/p transducer modules, identical control pressure signals or one or a plurality of high pressure and/or low pressure control signals can be supplied to one or a plurality of working chambers combined or as pairs of one respective high pressure and one respective low pressure control signal.

With the arrangements according to FIGS. 1 to 3, a rapid pressure regulation can for example take place in the drive chamber of the actuator 3. For this purpose, a pressure detecting component can optionally be provided in one of the slots 23a to 23d. In the case of a large pressure set-point value change, a rapid pressure adjustment can for example be achieved in that a plurality of control pressure signals are supplied to the actuator, e.g. all control pressure signals $S_{1-4}$ according to FIG. 1 or the signal $S_2$, large volumetric flow, with the signal $S_1$ according to FIG. 2 or both control pressure signals $S_{2-3}$ according to FIG. 3.

In order to enable an exact pressure regulation, one of the pressure signals in the case of unequal pressure signals, namely the one of larger volumetric flow, can be activated for just a short time and the fine regulation can take place essentially via the further control pressure signal. In the case of small pressure set-point value changes, a low pressure control signal or a signal of small volumetric flow can also be used exclusively. In the case of more than two interconnected control pressure signals, other signal combinations may be advantageous, e.g. rapid pressure change with three signals and fine regulation with two signals or one signal.

In the same way, a rapid regulation of the valve position of the control valve 5 can for example be achieved according to FIG. 2, wherein a large volumetric flow is achieved by combination of the boosted control pressure signal $S_2$ with the control pressure signal $S_1$ for rapid coverage of the valve path, and the fine regulation takes place under reduction of the volumetric flow by means of the unboosted signal $S_1$.

Furthermore, according to FIG. 3, a simultaneous control with two control pressure signals $S_{2-3}$ can for example help to overcome the static friction in a valve and therefore to reduce the delay time resulting from the adhesion, which usually makes the regulation difficult. One of the control pressure signals is switched off by means of deactivation of the I/p transducer in this case after overcoming the static friction. The point in time of the overcoming of the static friction can be determined by means of a reference experiment and stored in the microprocessor, or can be determined by means of suitable measuring technology which can likewise be provided as a module in a plug-in slot. The ultimate fine regulation of the valve position takes place on the basis of a control pressure signal, namely the low pressure control signal.

The regulation reliability with the arrangement according to the exemplary embodiment of FIG. 3 can be improved in that, in the case of a rapid position regulation using both control pressure signals $S_{2-3}$, in the event of a vibration excitation due to the process medium, one of the control pressure signals is switched off and the regulation takes place exclusively on the basis of just one signal, generally the low pressure control signal, until the tendency to vibrate has decreased.

The features disclosed in the above description, the figures, and the claims can be of significance individually as well as in any combination for the realization of the invention in the various embodiments.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A pneumatic drive system for actuating a control valve, comprising:

a pneumatic working chamber and a current/pressure transducer coupled with the working chamber for loading the working chamber with a pneumatic pressure to move the control valve; and the current/pressure transducer having an electrical input configured to receive an electrical control signal, the current/pressure transducer being configured to:

generate at least two pneumatic control signals with which the working chamber is loaded, the at least two pneumatic control signals including a high flow rate control signal having a high flow rate and a low flow rate control signal having a low flow rate;

supply the high flow rate control signal and the low flow rate control signal to the pneumatic working chamber simultaneously to regulate a position of the control valve;

switch off the high flow rate control signal while maintaining the low flow rate control signal in the event that at least one of a permitted vibration amplitude limit and vibration frequency limit is exceeded at the control valve.

2. The drive system according to claim 1 wherein the current/pressure transducer performs at least one of the following functions:

generates the at least two pneumatic control signals independently of one another; and supplies the at least two pneumatic control signals to the working chamber independently of one another.

3. The drive system according to claim 1 wherein air flow rates of the at least two pneumatic control signals are pre-set.

4. The drive system according to claim 1 wherein the current/pressure transducer has a regulating electronics which regulates the generation or supply of the at least two pneumatic control signals on the basis of at least one of a received set-point control value and an actual control value, the at least two pneumatic control signals being generated by respective independent subassembly transducers operating independently of each other.

5. The drive system according to claim 4 wherein the regulating electronics has a clock generator which temporally times a loading of the working chamber with said at least two pneumatic control signals in such a manner that the at least two pneumatic control signals are supplied to the working chamber simultaneously.

6. The drive system according to claim 1 wherein the current/pressure transducer has at least two pneumatically separated pneumatic output ports which are connected to the working chamber, and wherein the at least two pneumatic control signals leave the current/pressure transducer separately from one another via the at least two pneumatically separated pneumatic output ports.

7. The drive system according to claim 1 wherein a line network with parallel lines connects to the current/pressure transducer, said parallel lines each conducting a respective one of said at least two pneumatic control signals.

8. The device of claim 1 wherein the control valve comprises a processing plant control valve.

9. A method for operating a pneumatic drive system for actuating a control valve, comprising:

loading a pneumatic working chamber with pneumatic pressure in order to move the control valve into a position; and supplying at least two pneumatic control signals to the working chamber using electropneumatic conversion, the at least two pneumatic control signals being provided with differently sized air flow rates to regulate the position of the control valve, wherein the at least two pneumatic control signals are supplied to the working chamber simultaneously, and in the event that at least one of a permitted vibration amplitude limit and vibration frequency limit is exceeded at the control valve, one of the at least two pneumatic control signals with a high air flow rate is switched off while maintaining another of the at least two pneumatic control signals with a low air flow rate.

10. The method according to claim 9 wherein each of said at least two pneumatic control signals is generated by an individual current/pressure conversion procedure.

11. The method according to claim 9 wherein air flow rates of the at least two pneumatic control signals are preset.

12. The method according to claim 9 wherein the at least two pneumatic control signals are provided with differently sized pressure values, wherein only a high pressure control signal or high air flow rate control signal is switched on for opening or closing the control valve, or only a low pressure control signal or low air flow rate control signal is switched on for carrying out a partial stroke test.

13. The method according to claim 9 wherein the at least two pneumatic control signals have differently sized pressure values, and wherein, to displace the control valve, the at least two pneumatic control signals with differently sized pressure values are simultaneously supplied to the working chamber during a predetermined pulse period or for as long as it takes for the control valve to respond, and subsequently one of the control signals is switched off.

14. The method of claim 9 wherein the control valve comprises a processing plant control valve.

* * * * *